United States Patent Office.

ALBERT T. RAND, OF NEW YORK, N. Y.

Letters Patent No. 70,359, dated October 29, 1867.

---

IMPROVED COMPOUND FOR BLASTING-POWDER.

---

The Schedule referred to in these Letters Patent and making part of the same.

---

TO ALL WHOM IT MAY CONCERN:

Be it known that I, ALBERT T. RAND, of the city, county, and State of New York, have invented a new and useful Compound for Blasting Purposes.

The object of my invention is to produce a powder suitable for blasting, which, when fired, will produce less smoke, and of less offensive character, and more easily dispersed, than the smoke produced by powder heretofore used.

I accomplish this object by using carbon, in any of the forms in which it is used in powder, as the only ingredient for producing combustion and explosion, in combination with the nitrate of soda.

In the manufacture of my blasting-powder I prefer to use charcoal, as the best form of carbon, which I mix with the nitrate of soda in the following proportions, by weight, to wit: Nitrate of soda, sixty (60) parts, and charcoal, forty (40) parts, prepared, mixed, granulated, and dried in the usual manner.

I have given what I regard as the best proportions of carbon and nitrate of soda, but I do not strictly limit myself to these proportions, since they may be varied without departing from the essential character of my invention.

What I claim as my invention, and desire to secure by Letters Patent, is—

A compound or powder, made substantially as above described, for the uses and purposes above set forth.

ALBERT T. RAND.

Witnesses:
    E. J. BUTLER,
    JULIUS R. POMEROY.